Jan. 13, 1953  W. K. WIGHT  2,625,082
CAMERA BELLOWS FOLDING MACHINE
Filed Feb. 23, 1949  8 Sheets-Sheet 1
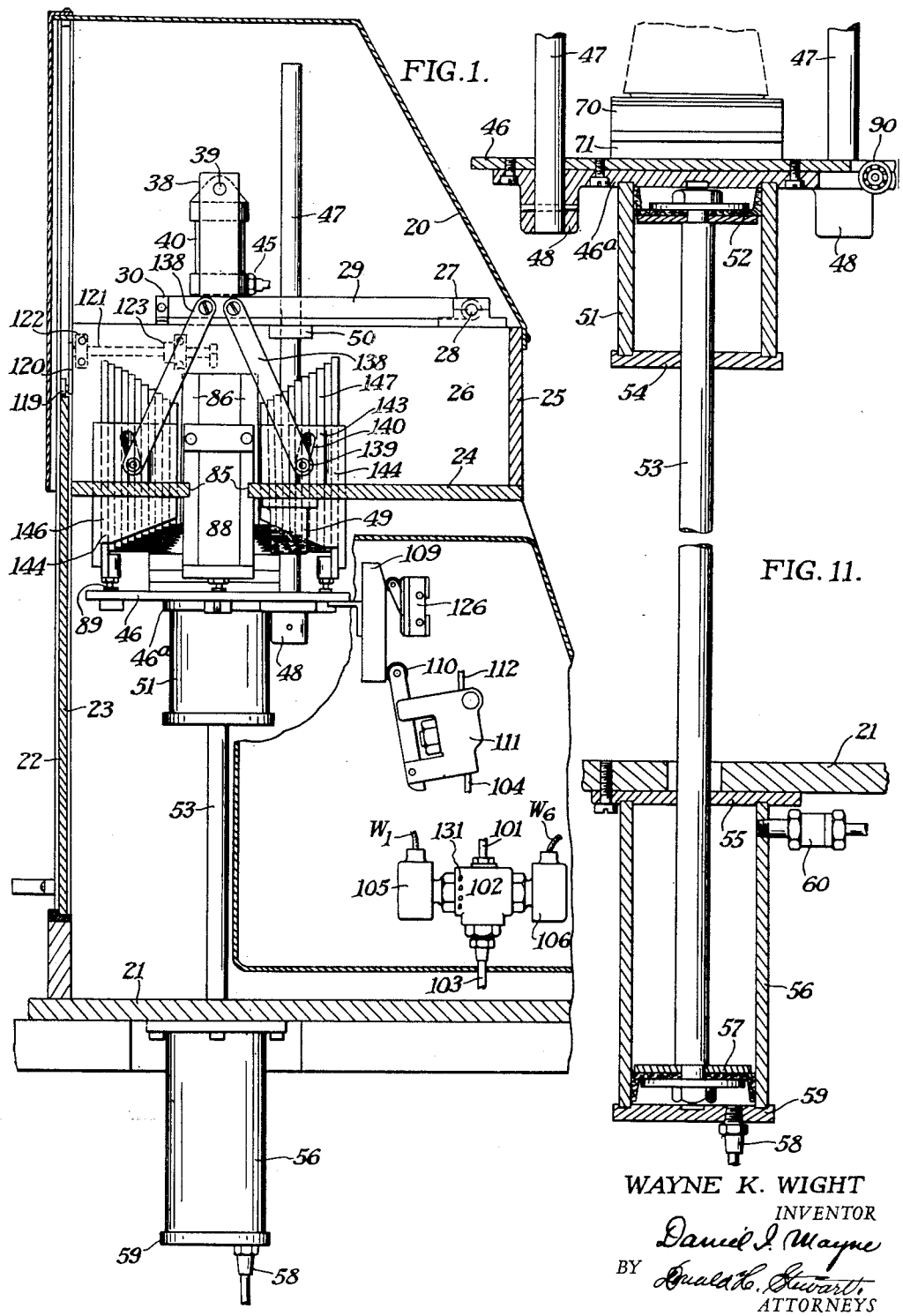
WAYNE K. WIGHT
INVENTOR
BY Daniel J. Wayne
Donald H. Stewart
ATTORNEYS Jan. 13, 1953  W. K. WIGHT  2,625,082
CAMERA BELLOWS FOLDING MACHINE
Filed Feb. 23, 1949  8 Sheets-Sheet 2
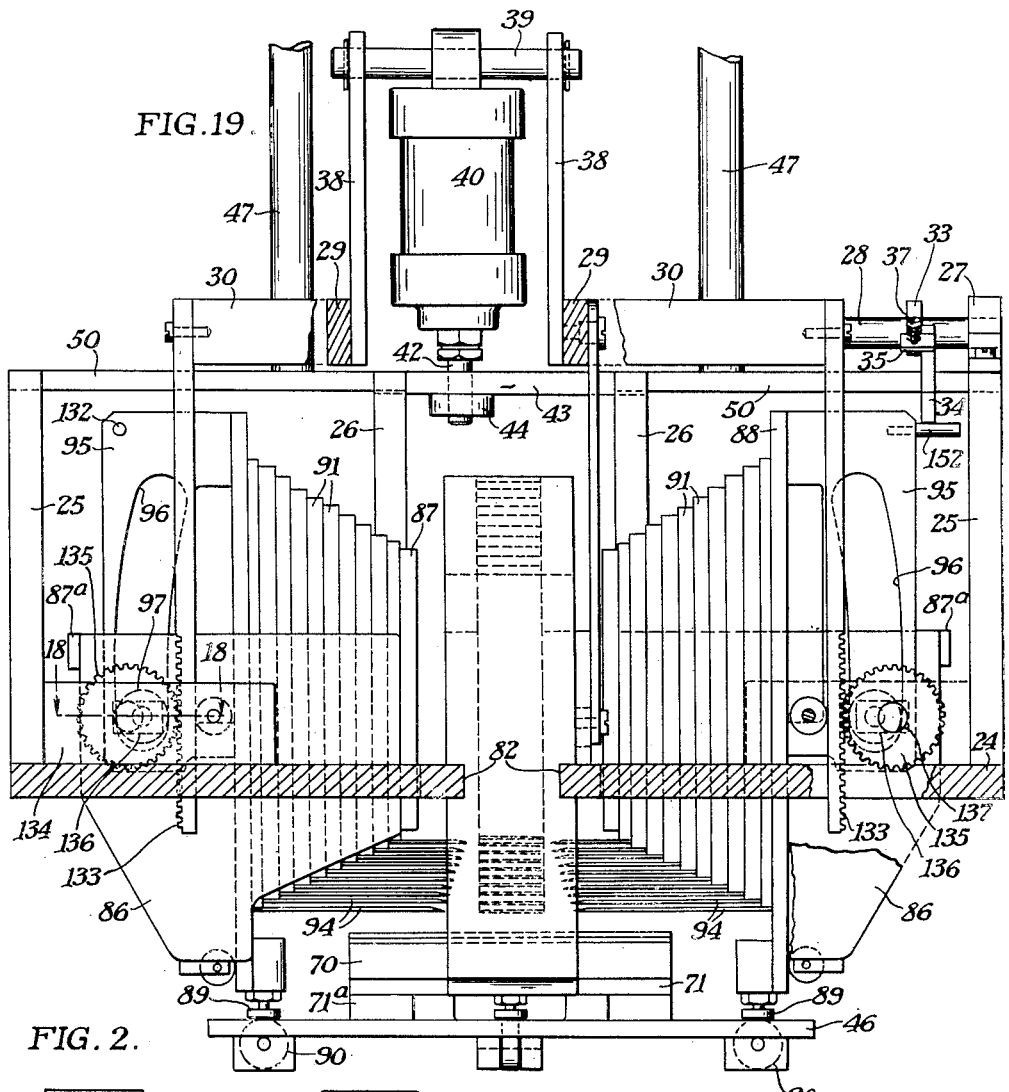
WAYNE K. WIGHT
INVENTOR
BY
ATTORNEYS Jan. 13, 1953 W. K. WIGHT 2,625,082
CAMERA BELLOWS FOLDING MACHINE
Filed Feb. 23, 1949 8 Sheets-Sheet 3
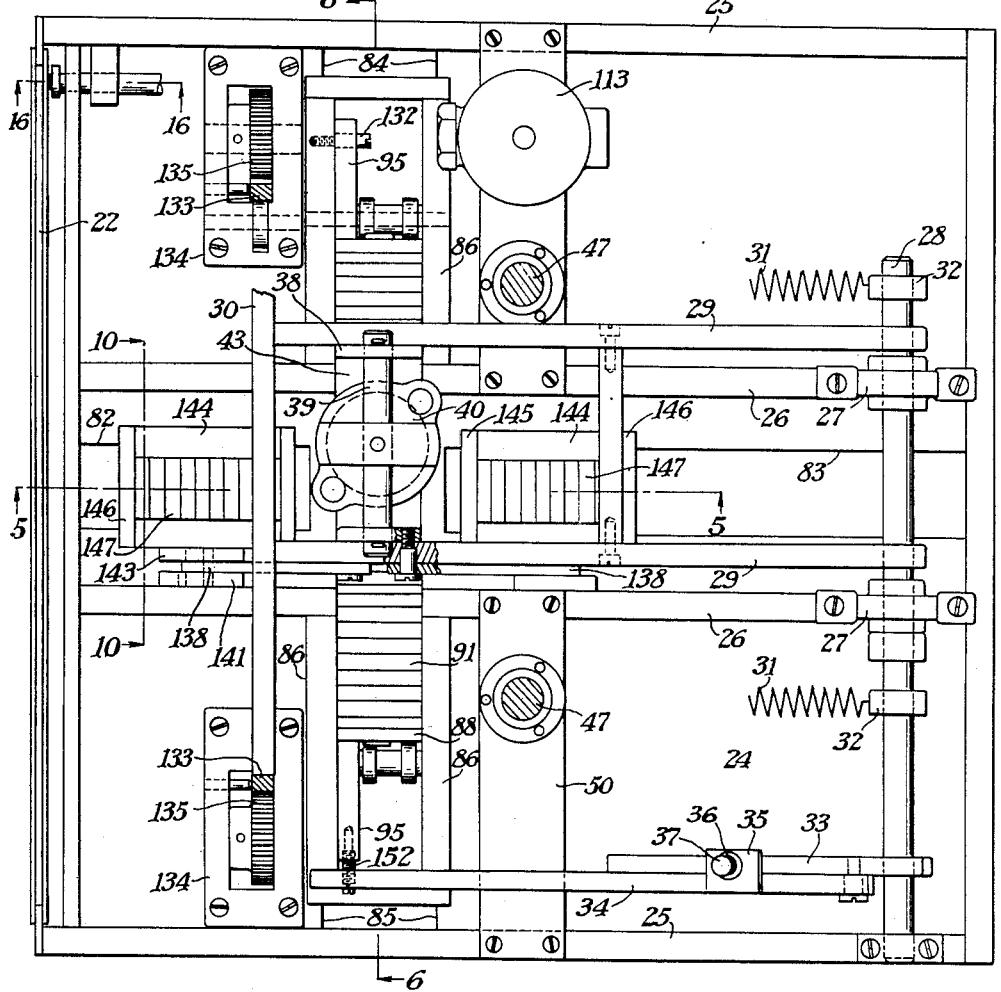
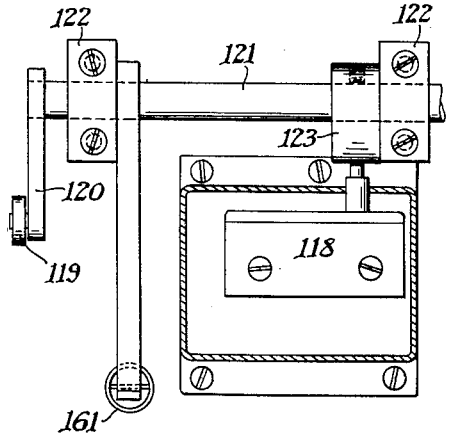
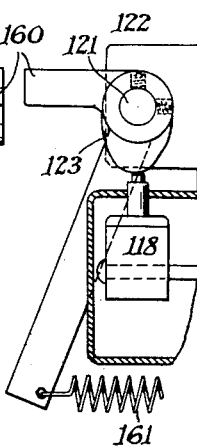
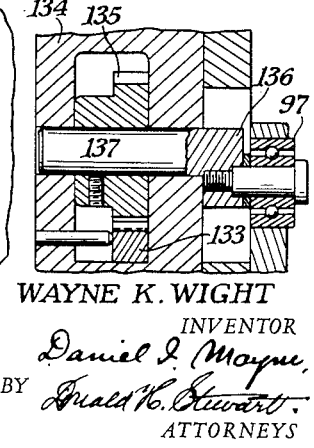
WAYNE K. WIGHT
INVENTOR
BY Daniel I. Mayne
Donald H. Stewart
ATTORNEYS Jan. 13, 1953 W. K. WIGHT 2,625,082
CAMERA BELLOWS FOLDING MACHINE
Filed Feb. 23, 1949 8 Sheets-Sheet 4

WAYNE K. WIGHT
INVENTOR
BY
ATTORNEYS

Jan. 13, 1953 W. K. WIGHT 2,625,082
CAMERA BELLOWS FOLDING MACHINE
Filed Feb. 23, 1949 8 Sheets-Sheet 6

WAYNE K. WIGHT
INVENTOR

BY Daniel J. Mayne
Donald H. Stewart
ATTORNEYS

Jan. 13, 1953 W. K. WIGHT 2,625,082
CAMERA BELLOWS FOLDING MACHINE
Filed Feb. 23, 1949 8 Sheets-Sheet 7
FIG. 12.
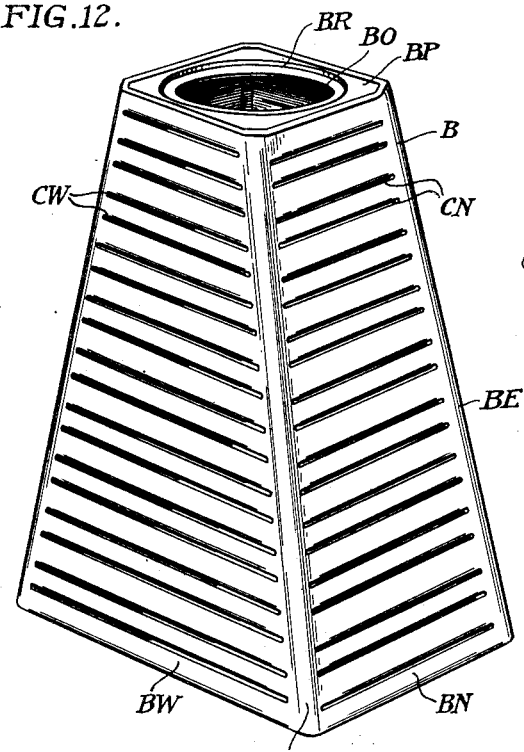
FIG. 13.
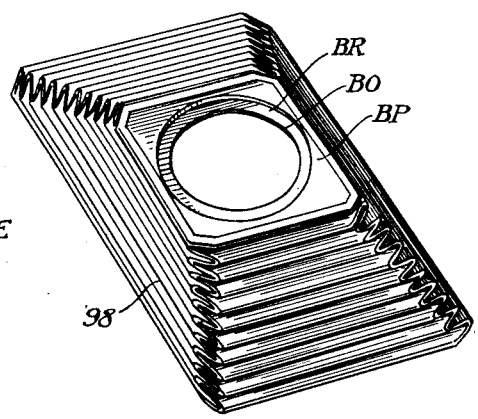
FIG. 15.
FIG. 14.
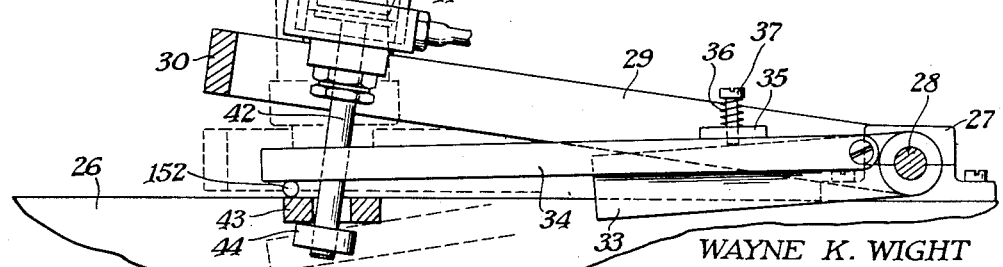
WAYNE K. WIGHT
INVENTOR
BY
ATTORNEY

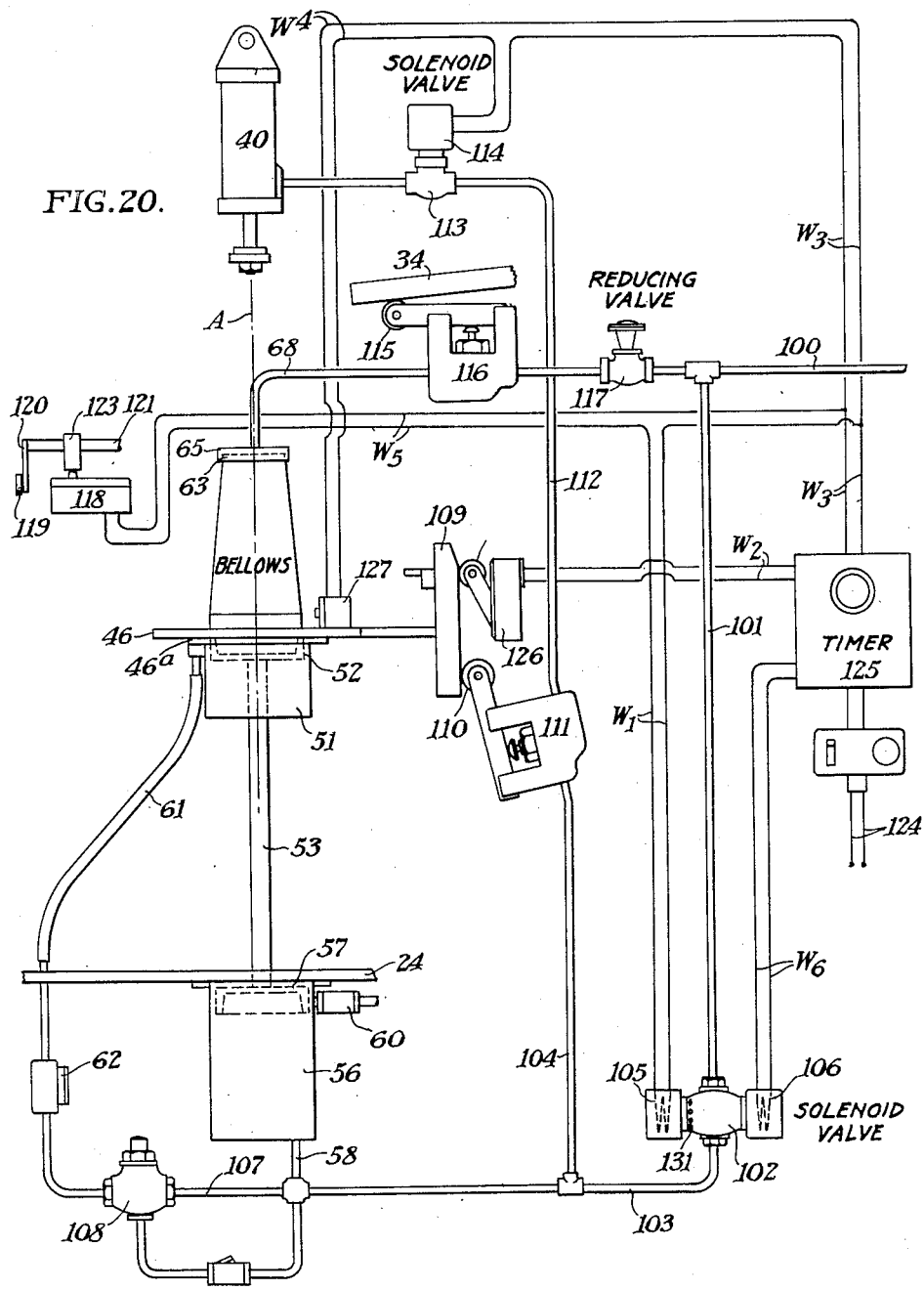

Patented Jan. 13, 1953

2,625,082

UNITED STATES PATENT OFFICE 2,625,082

CAMERA BELLOWS FOLDING MACHINE

Wayne K. Wight, Rochester, N. Y., assignor to Eastman Kodak Company, Rochester, N. Y., a corporation of New Jersey Application February 23, 1949, Serial No. 77,847

19 Claims. (Cl. 93—36)

This invention relates to a machine for folding camera bellows. Such bellows are usually in the form of a truncated pyramid, having four or more sides. Each side is provided with a plurality of folds, so that a camera, equipped with such a bellows, may be opened and extended into a picture-taking position, and closed into a folded position with the bellows collapsed, thereby reducing the overall length of the bellows many times.

My present invention is particularly directed to a machine which may receive tubular-shaped bellows forms in which the creases are to be made. The bellows material may or may not be equipped with weakened lines to facilitate the folding operation.

One object of my invention is to provide a machine which will rapidly and accurately provide a series of folds in a square or truncated pyramid-shaped bellows.

Another object of my invention is to provide a machine of the class described which requires a minimum amount of skill on the part of an operator to fold bellows successfully.

Another object of my invention is to provide a machine which will protect the hands of an operator from the moving parts of the machine and the fold plates to prevent injuries.

A still further object of my invention is to provide an enclosed machine in which the automatic release of a door to an open position automatically prevents further operation of the machine until the door is closed.

A still further object of my invention is to provide a novel means of moving the fold plates in the desired relationship to-and-from the bellows, and to-and-from each other.

A still further object of my invention is to provide a machine of the class described in which the sequence of operations may be automatically carried out through the movement of simple controls by an operator. Other objects will appear from the following specification, the novel features being particularly pointed out in the claims at the end thereof.

My present invention may be considered to be an improvement over the camera bellows forming mechanism shown in U. S. Patent 2,169,205, E. J. Hornung, granted August 8, 1939. While the machine in the patent shows four sets of fold plates, the construction and operation of the machine is entirely different, as will appear from the following specification.

Coming now to the drawings wherein like reference characters denote like parts throughout:

Fig. 1 is a side elevation partially in section showing the general arrangement of a bellows-folding machine constructed in accordance with and embodying a preferred form of my invention;

Figs. 2 and 3 show details of a cam slot and roller mechanism for operating two sets of fold plates to-and-from each other. In Fig. 2 this operating mechanism is shown before the folding operation, and in Fig. 3 the mechanism is shown after the folding operation;

Fig. 4 is a top plan view of the folding mechanism of the machine, together with a number of electrically operated elements, the upper portion of the housing being removed;

Fig. 8 is a fragmentary top plan view, parts being shown in section of the bellows-clamping device;

Fig. 11 is a vertical section through the pneumatic lifting mechanism;

Fig. 12 is a perspective view of a camera bellows ready for a folding operation;

Fig. 13 shows in perspective the same bellows folded and compressed;

Fig. 14 is a partial side elevation of an auxiliary pneumatic device;

Fig. 15 is an enlarged detail section of the upper end of a bellows and showing a seal inserted to retain air within the bellows;

Fig. 16 is a fragmentary side elevation of a safety latch for the door;

Fig. 17 is a fragmentary end elevation of the same parts;

Fig. 18 is a detailed view showing partially in plan and partially in section parts of the mechanism and taken on line 18—18 of Fig. 19;

Fig. 19 is an elevation partially in section of certain parts shown in Figs. 6 and 7 but viewed from the front looking toward the rear of the machine; and Fig. 20 is a diagrammatic representation of the pneumatic and electrical controls for the operation of the machine.

Camera bellows are customarily made of a number of layers of material which may be folded up into the form of a truncated pyramid. It is customary, but not always necessary, to provide a paper lining, omitting the paper over that area of the bellows which is to be creased, in order to make the bellows fold. The bellows may contain material which can be more readily folded and compressed when heated and, accordingly, I generally prefer to heat the truncated pyramid-shaped bellows blank before placing it in the machine for folding, because, by so doing and tightly compressing the folded bellows, the bellows will have a tendency to compress, rather than open. This is frequently desirable, particularly in certain types of folding cameras. If it is desirable to have a bellows which does not tend to contract, the bellows can be compressed with less force, or if the heating step is used, this may be omitted.

My improved machine is designed so that an operator may pass a bellows into a machine through an open door, close the door, thereby operating the machine automatically to move the bellows from a loading position upwardly into a position to be folded, after which the mechanism automatically creases and folds the bellows, compressing the folds momentarily, finally releasing the bellows and permitting the door to be opened for the removal of the creased and compressed bellows. The complete cycle of operations may be briefly described as follows:

(1) An operator closes a safety door which is then locked.

(2) Air is introduced into one cylinder to carry up platen-bearing bellows to a predetermined point to thereby bring the upper end of the bellows against a stop.

(3) A second air cylinder operates the corresponding mechanism to bring them into contact with the bellows.

(4) Low pressure air is admitted to the bellows to prevent the creasers from collapsing it; the creasers meanwhile holding the bellows against too great expansion.

Figure 7:
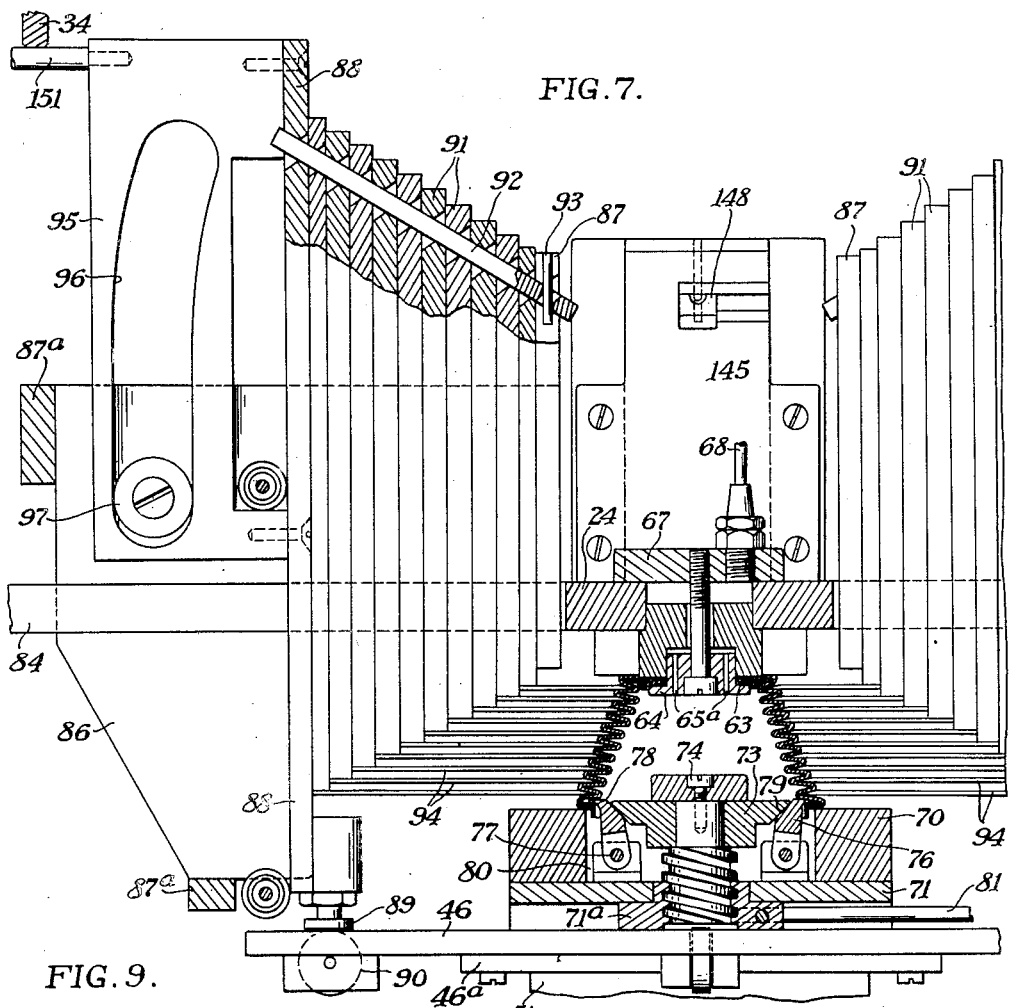
Fig. 7 is a similar view but with the bellows folded and compressed.
Figure 9:
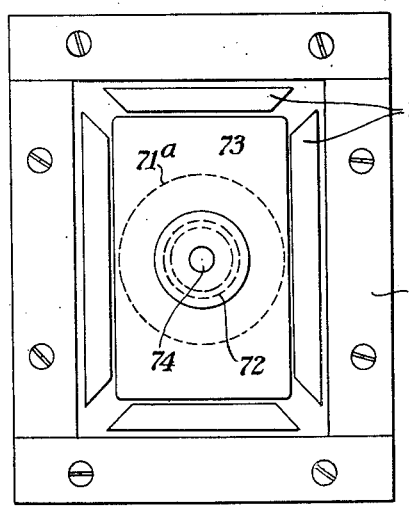
Fig. 9 is a top plan view of the bellows clamp.
Figure 10:
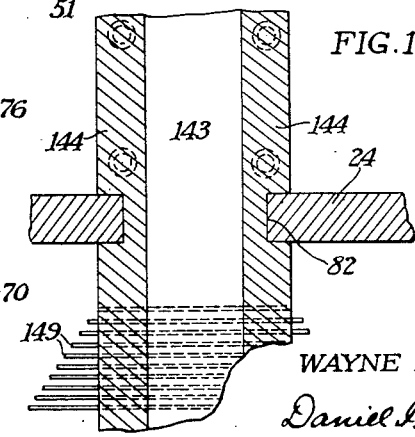
Fig. 10 is a vertical detailed section taken on line 10—10 of Fig. 4.

(5) Operator steps on a valve which (6) Causes the platen to move up, further compressing the bellows about the creasers, as shown in Figs. 7 and 13.

(7) Creasers move in still further through cam action, indenting the folds on all four sides of the bellows; the air pressure in the bellows forming the bellows outwardly between the folds and creasers.

(8) The automatic door is released and the automatic timer is set in operation by a microswitch actuated by the platen at its upper limit of travel, and the bellows is held in compressed condition for a predetermined time, according to the timer setting.

(9) The timer at the end of the period releases the air pressure. The platen then descends by gravity, moving the bellows downwardly into an accessible position, below the creasers.

(10) The door opens automatically and operator then may unclamp the lower end of the bellows and remove the folded bellows from the cabinet.

As shown in Fig. 12, the camera bellows, which has been blanked and which may be provided with fold marks, or lines, CW, CN, is glued up to form a truncated rectangular pyramid.

Figure 5:
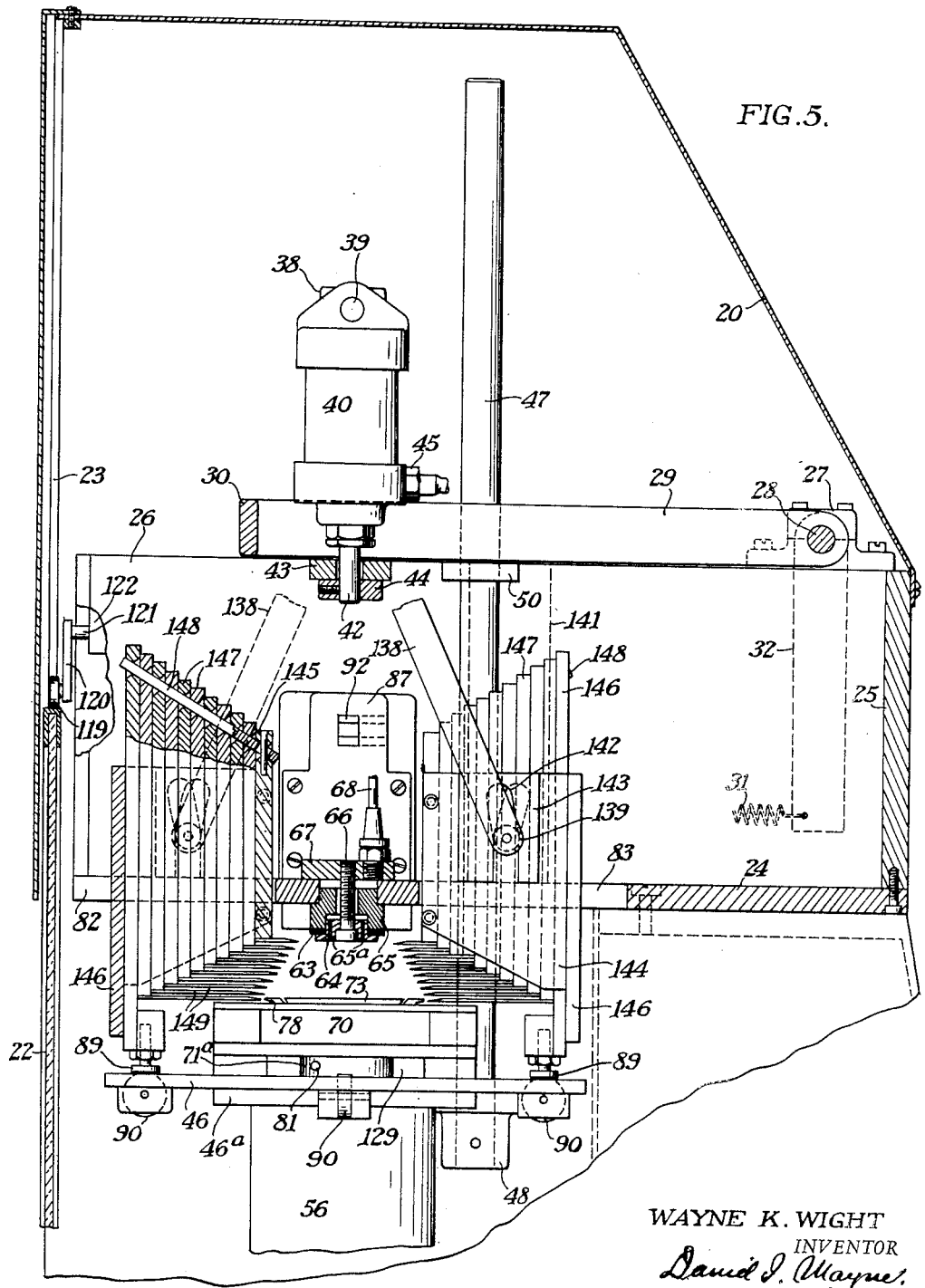
Fig. 5 is a vertical fragmentary sectional view, partly in elevation of the machine, taken on line 5—5 of Fig. 4 with certain parts omitted.

More specifically, referring to the drawings, Figs. 1 and 5 show a cabinet 20 which is mounted on a suitable table, or base 21. This is provided with a door 22 slidable in vertical ways 23 on the front of the cabinet. The door is biased to raise to an open position as by means of counterweights, or springs, not shown. The cabinet constitutes a suitable means for enclosing the bellows and the mechanism for folding the bellows, so that the operated parts are within this enclosure and the door prevents the operator from physical entanglement with the mechanism by reason of the interlocking safety mechanism which will be hereinafter described.

A horizontal mechanism plate 24 is carried by the cabinet and it carries outside plates 25 and partitions 26 extending from their front to the rear. Pillow blocks 27 are mounted on the top edges of partitions 26 and constitute bearings for shaft 28, to which is affixed a yoke, as indicated in Fig. 5. This yoke consists of two forwardly extending arms 29 with a cross bar 30 attached to their free ends. The shaft 28 is biased clockwise, as viewed in Fig. 5, by springs 31 pulling on downwardly extending arms 32, thus tending to lift the cross bar 30. A lever 33, as shown in Fig. 4, is also affixed to the shaft 28 and carries a second lever 34 carrying a plate 35. A stud 37 in the lever 33 carries a spring, tending to press levers 33 and 34 toward each other in a vertical direction.

The upright ears 38, shown in Figs. 1 and 5 and carried by yoke arms 29, support a rod or bar 39 on which an air cylinder 40 is suspended, this air cylinder having a piston 41, as indicated in Fig. 14, and a piston rod 42. The latter extends through a bar 43 attached to the plates 26 and has a collar 44 pinned to its lower end. When air is admitted through hose connection 45, it tends to raise the piston 41, but, as the rod 42 cannot move upwardly, the cylinder 40 is caused to descend, carrying yoke 29—30 with it to the broken line position indicated in Fig. 14 and thereby accomplishing the operative movement of parts which will be hereinafter more fully described.

The mechanism for elevating the platen is best shown in Figs. 1 and 11. The platen proper is a flat metal plate 46 that may be raised through a vertical path and is guided by two rods 47 pinned to bosses 48 on a sub plate 46-A fixed to the underside of the plate, or casting, 46. The rods 47 extend through guides 49 attached to the underside of septum 24 and also through the bars 50 set in the partitions 26, and are thereby constrained to a vertical straight line up-and-down movement. The platen therefore cannot deviate preceptibly from a line A, indicated in Fig. 20, to which the rods 47 are parallel. The line A constitutes the operating center of the machine.

A cylinder 51 is attached to the underside of the subplate 46-A and carries a piston 52 on the upper end of a piston rod 53 which extends through the lower head 54 and into a second cylinder 56. Cylinder 56 is supported from a top head 55 fixed to the underside of the base plate 21. Another piston 57 is bolted to the lower end of the piston rod 53 and lies at the bottom of the cylinder 56 when the machine is ready for the insertion of a bellows. Air, under pressure, may be admitted between the piston 57 and the lower head 59 through pipe 58. The air above the piston may escape through a speed control valve 60. Air may be admitted to the cylinder 51 above the piston 52 through a flexible tube 61, Fig. 20, after having passed through a restricting or regulating valve 62.

Referring to Figs. 12 and 13, the bellows is formed into a truncated pyramid B usually having two narrow sides BN and two wide sides BW. Creases CN and CW may be impressed in the bellows and they are offset one from the other. When creased, the rounded corners BE are not sharply creased and remain smooth. A rectangular metal frame BF, indicated in Fig. 6, having an angle iron cross section is cemented or otherwise attached in the large end of the bellows, and a plate BP recessed at BR and perforated at its center BO is cemented or otherwise attached to the small end of the bellows, which is the upper end in Fig. 12. The recessed area BR in plate BP is adapted to press against a gasket 63 of sponge rubber, or the like, as indicated in Fig. 15. This is clamped between a retaining plug 64 and a socket 65 by a screw 66 which passes through an opening in the mechanism plate 24 into a cap 67. These parts form an abutment to stop upward movement of the bellows and the gasket 63 constitutes an air seal which permits the bellows to be inflated when air, under reduced pressure (about 15 p. s. i.) is admitted through pipe 68 and air channels 65a at the proper time. It might be pointed out that it is not necessary or desirable to have a complete air seal. Some leakage is convenient and tends to prevent too great pressure from building up inside of the bellows.

Figure 6:
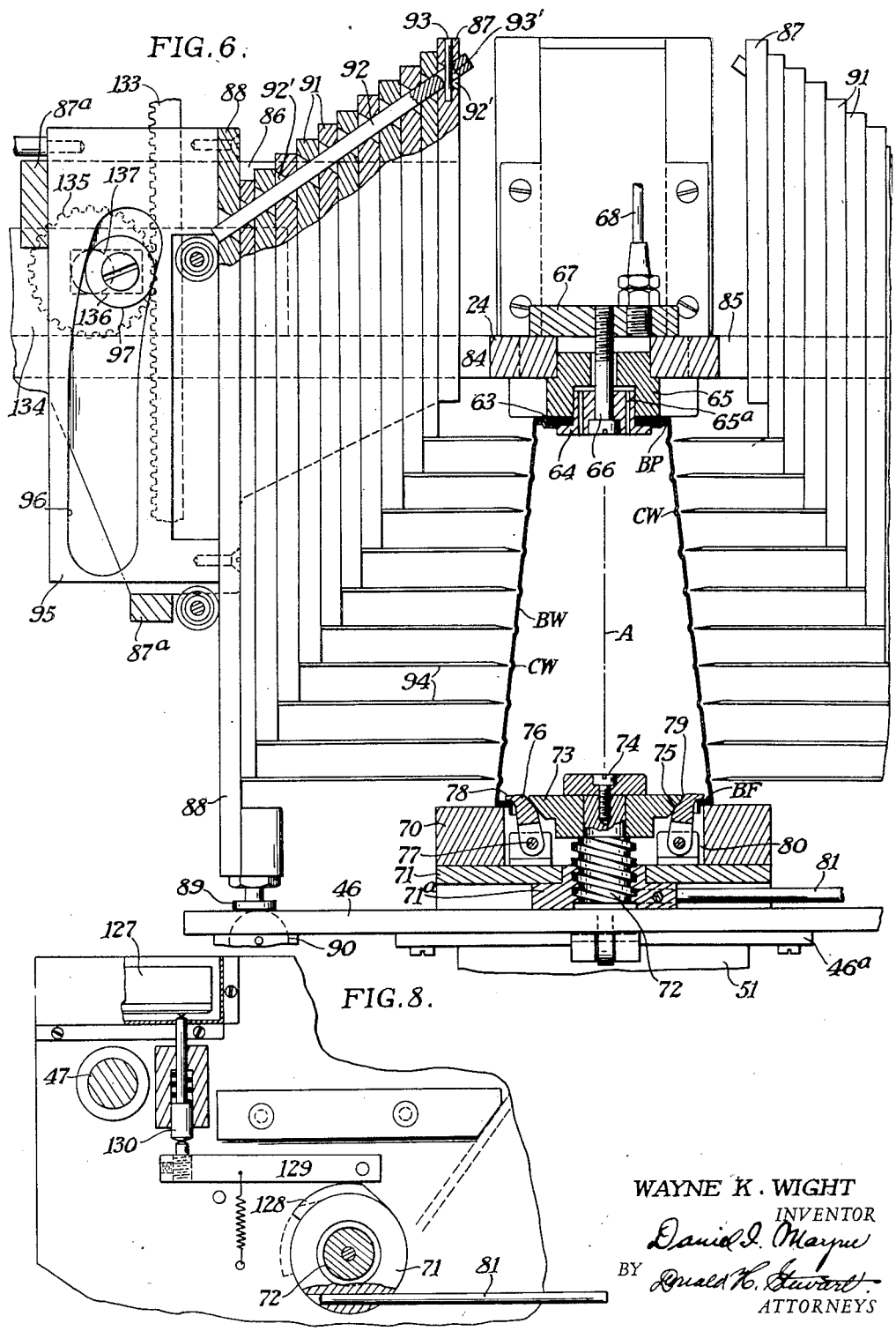
Fig. 6 is an enlarged vertical section showing two groups of folding elements and taken on line 6—6 of Fig. 4. The parts are shown in their lowermost position with an unfolded bellows in place for folding.

Figs. 6 and 8 show means for retaining the bellows in place on platen 46 so that it may be elevated from its loading position toward a folding position and into contact with a washer 63 where it may be held while the folder plates 94, which will be later described, make the creases in the bellows walls. A block 70 is fixed on a spacer 71 on the upper face of platen 46. A multiple thread spindle 72 extends through a central tapped aperture in a nut 71-a and is provided with a shoulder for a clamp 73 and is retained therein by a screw 74. Clamp 73 has tapered edges 75 on both the sides and ends. Bars 76 pivoted at 77 have hook-like upper outer edges 78 and tapered inner faces 79. A recess or aperture 80 through the block 70 is of such dimensions that the angle metal frame BF will rest thereon with one flange projecting downwardly into the aperture.

A handle or lever 81 projects from the nut 71-a to a point where it may be grasped by the operator, and when the handle is pulled forwardly, the nut 71-a rotates about the non-rotating thread 72, thereby pulling the spindle and the clamp 73 downwardly, so that the tapered edges 75 switch the bars 76 apart and cause the hooked ends 76 to press the frame BF tightly against block 70 so that the bellows is firmly held against lateral movement and cannot be dislodged accidentally. I have found that clamping bars 76 may be employed on all four sides or on only two sides, if desired. As above explained, a perfectly air-tight clamp is not required. When an operator attaches the lower end of the bellows, as above described, it is ready to be raised from the loading to the folding position between the fold plates which will now be described.

The plate 24, Figs. 5 and 6, includes four slots 90° apart, extending inwardly from the edges of the plate to a point adjacent the cap 67. One pair of slots 84—85 is parallel with the door 22 and the other pair of slots 82—83 is normal to the door. A rectangular hollow housing or shroud lies in each of these slots, and the shroud is grooved on its longer sides to engage the slots being capable of being moved bodily toward or away from the operating center of the machine; that is, the line A shown in Fig. 20 concentric with the piston rod 53.

Each of the above-mentioned shrouds is made up of side plates 86 and inner plate 87, an outer plate 88 and cross bars 87-A, as best shown in Figs. 5, 6, and 7. There is a gang of ten vertically slideable plates 91 in the present example in each shroud; each plate being in contact with the next plate and each plate carrying on its lower end a folder blade 94 extending at an angle to the plate. These folder plates are adapted to engage a bellows BE exactly in the creases CN or CW.

The vertical plates 91 are confined within the shrouds wherein they may move to different degrees in a vertical direction, but they cannot move horizontally within the shrouds. Opposite pairs of the shrouds may move horizontally but not vertically by reason of their engagement with the edges of the slots 84—85 in plate 24, above mentioned. Therefore, each gang of ten vertical plates with their horizontal fold plates may be moved toward or from the center point regardless of the position of the plates vertically within the shrouds.

Referring to Fig. 6 which shows the gang of plates which are movable parallel with the door 22, this also being shown in Fig. 1, it may be noted in each gang the side plates 86 are connected by an inner plate 87 and an outer plate or bar and outer plates or bars 87-A which are spaced apart. The outermost movable plate 88 has an adjustable foot piece at the bottom 89 which rests on a roller 90 mounted in the platen 46. The movable plates 91 nested together are slideable vertically and are caused to rise symmetrically by a link 92 passing through the plates. These links may lie in milled slots 92' near the upper edges of the plates. The link 92 can be rocked on plate 87 which is fixed with respect to the plates 91. A dowel 93 passing through a hole 93' in link 92 holds the link in proper position and permits the link to be turned about its fulcrum so as to differentially move the various plates 91 in a vertical direction. This, of course, will vary the separation between the fold plates carried by the vertically sliding plates 91. It will be noticed that the milled slots 92' in each plate have portions near the center lying closer together than the outer edges of the slots so that they are of a V-shape in cross section. This particular formation is useful, since it definitely limits the travel of the link 92 in both directions, because after one portion of the slot lies in contact with the edge of the link 92, no further movement can take place.

Each of the ten plates includes a folder blade 94 fixed to its lower end, preferably at 90° thereto; this fold plate extending towards the operating center A of the machine. Each of these folders is beveled at its inner edge to provide a comparatively sharp contact with the bellows B, although the blade is, of course, not sharp enough to actually cut into the bellows material. Each folder blade 94 is positioned to accurately engage the creases CW and is of an appropriate width to engage the creases CW throughout their length. Thus, if the bellows is square, all of the blades will be the same length, whereas if the bellows is rectangular the blades must be of a length to engage the particular side of the bellows that they are designed to contact.

The operation which causes the folders 94 to perform their function can take place as follows.

Assuming that the parts are in position of Figs. 6 and 20, wherein the lower piston 57 has been moved to the top of the cylinder 56 by air admitted through pipe 58, and, in so moving, has lifted cylinder 51 and the entire platen 46, the bellows and guide rods 47 upwardly so that the bellows now occupies the Fig. 6 position with the creases or lines of contact CW aligned with the folder plates 94. Each of the outer plates 88, Figs. 5 and 6, has an outstanding bracket 95 attached to it with a cam slot 96 extending nearly its full length. A roller 97 is located in each slot. These rollers are carried by cranks 136 on one end of shafts 137 that are supported in blocks 134 on plate 24, as shown in Fig. 4. Each shaft 137 carries a gear 135 meshing with a vertical rack 133. These racks are suspended from one end of a yoke cross bar 30.

When air is admitted to cylinder 40, Figs. 1 and 20, at a suitable point in the cycle, the cylinder will carry the yoke 29 and bar 30 downwardly. Racks 133 will rotate gears 135 through approximately 90°, thereby moving the cranks 136 and the rollers 137 from a vertical position to the horizontal position of Fig. 6. Both entire groups of plates 91, with their enclosing shrouds, are thus moved inwardly to the position of Fig. 6 so that the leading edges of the creaser blades 94 are substantially in contact with the bellows. If air is now admitted into the cylinder 51 through pipe 61, the piston 52 cannot move downwardly because high-pressure air in the cylinder 56 is still holding piston 57 at its upper limit. Therefore, cylinder 51 will rise carrying the platen 46 with it. Rollers 90, Fig. 7, then strike the foot pieces 89 and lift plates 88. The link 92 then functions as a lever by turning on its fulcrum on the stationary inner plate 87, so that as the platen continues to rise, all plates 88 are lifted and all of the plates 91 move vertically and to different extents. At the same time the sets of plates move toward the center A because the rollers 97 roll against the cam slots 96, thereby causing the folder plates to press into the bellows and to form folds 98. It should be noted that the contour of the cam slots 96 is such that the inward movement progresses rapidly at first and then becomes more gradual and substantially stops after a portion—about half—of the rise is completed.

The first three figures show the means for folding the narrow sides of the bellows which, in this instance, face toward the front and rear of the machine. One of the yoke bars 29 has pivoted to it two pitmans 138, each of which carries a roller 139 at its lower end lying within a cam slot 140 in a fixed plate 141 and also in an oppositely angled cam slot 142 in a movable plate 143. The latter is attached to one side of plate 144 of a shroud which is made up of two such side plates and two end plates 145 and 146. This shroud encloses a gang of vertically movable plates 147; these plates having a through link 148, indicated in Fig. 5. They resemble the plates 91 generally and they have, at their lower ends, a set of folder blades 149 similar to the folder plates 94 of plates 91. They may differ in size according to the proportion of the bellows for which the machine is designed. The plates 146 also have foot pieces 89 which bear on rollers 90 aligned with them.

The downward movement of the pitmans 138 occurs simultaneously with the rotation of the gears 135 by racks 133 inasmuch as these parts are all actuated by the downward movement of the yoke 29. Therefore, the pitmans cause the cam plates 143 to approach each other carrying the shrouds 144, 145, 146 along slots 82, 83 and the folder blades 149 then engage the narrow sides BN of the bellows as they meet the creases CN in the same manner as the plates 94 heretofore described. When in this position the truncated cone bellows blank is engaged on all four sides by the folder plates. The operation and sequence of the machine components above described is as follows.

Referring to Figs. 1 and 5, the door 22 is normally held in elevated or open position as by counterweights or springs, not shown. When open, the microswitch 118, Fig. 20, is held open by the mechanism of Fig. 16, so that the door prevents arm 120 from moving outwardly. This microswitch controls a main air valve 102 and no air can be admitted to cylinder 56 until the door is fully closed, whereupon the roller 119 overlies the upper edge of the door and permits the roller 119 on arm 120 depending from a shaft 121 and supported in bearings 112 on the side wall of the casing 20 to move outwardly. A cam 123 on this shaft then closes switch 118. With the door open, the operator places the bellows in the mechanism which is then in a loading position beneath the folding mechanism, so that the bellows can be freely moved with the large end downward and may be attached to block 70 by clamping it in place through movement of the handle 81. Only one end of the bellows need be attached, and this action, in addition to clamping the bellows frame BF under the clamp 76, also rotates a cam 128, Fig. 3, to swing lever 129 against a spring plunger 130 which, in turn, closes microswitch 127 mounted on the platen 46. This switch closes a circuit preferably from a 110-v. source 124 through a timer 125 and thus through wires W3 and W4 to operate a solenoid 114 which opens a valve 113 in an air pipe 112 to which air may be supplied through the pipe 104 if and when valve 102 is open.

The operator moves the door 22 manually to the bottom of guides 23 and, as above stated, thus closes microswitch 118. Current may flow through wires W5 and W1 from W3 and energize a solenoid 105 which opens valve 102. Air immediately flows from a pressure source 100 through pipes 101, 103 and 58 to cylinder 56. The piston 57 rises carrying platen 46 and the bellows upwardly and into a position to be folded. This position is reached when the upper end of the bellows contacts with the washer 63 and the piston 57 strikes the upper head of cylinder 56.

As the platen rises, a cam 109 carried thereby opens an air valve 111 admitting air through valve 113 which was opened by a solenoid 114 when the operator clamped the bellows on the platen and closed microswitch 127 to cylinder 40. When cylinder 40 moves downwardly, it carries yoke 29, 30 and racks 133 with it to rotate cranks 136 from a vertical position (not shown) to the horizontal position shown in Fig. 6. The particular means 138 are also actuated. At the same time and with the same movement of yoke 29, lever 34 opens valve 116, allowing air which has been reduced to moderate pressure by the pressure reducer 117 to fill the bellows through ports 65-a. Since the bellows does not have a perfectly air-tight connection with its clamp and with the upper washer, and since the air introduced into the bellows is under a reduced pressure, this pressure merely presses the bellows outwardly against the folder plates and is insufficient to damage the bellows.

At the same time high pressure is still in cylinder 56 and holding the piston and rod assembly elevated as in Fig. 20. When the operator depresses a foot-operated valve 108, air will flow from pipe 107 through valve 108 through the pressure regulator 62, and a flexible connection 61 to cylinder 51 above piston 52. This piston cannot move down against the thrust of piston 57 so that the entire cylinder with the platen 46 must move upwardly.

The length of cylinder 51 is such that during the movement of the plates 88 and the slotted brackets 95 move nearly the length of the cam slots 96. The rollers 97 are now on a dead center, as indicated in Fig. 6. This prevents brackets 95 from moving upwardly and both brackets and both gangs of plates 91, blades 94, etc., move inwardly to the extent of the offset slots 96. Folder blades 141 have contacted the narrow sides BM of the bellows, as before described, by the downward movement of the pitmans 138 with the yoke 29.

During the last portion of the upward movement of cylinder 51, two additional actions take place. The bracket 95 on the right-hand side of the machine toward the bottom of Fig. 4 carries a laterally projecting pin 152. This strikes lever 34 and raises it slightly (because of the yielding connection 36, 37 with lever 33) and this permits valve 116 to close, cutting off air to the bellows through the pipe 68. While some of the air may have leaked out of the bellows during the above operations, this prevents the bellows from bursting and air trapped therein may readily escape along the soft washer 63 and the plate BP, since a completely air-tight connection has been purposely avoided.

The bracket 95 at the end of the machine (top in Fig. 4) carries a forwardly projecting pin 132 which near the top of the final travel of the platen strikes an arm (Figs. 16 and 17) on shaft 121. This accomplishes two results. First, it opens microswitch 118 by rotating the cam 123, thereby deenergizing solenoid 115 on solenoid valve 102; and, second, it moves roller 119 away from the position in which it has overlain the top of door 22. The door then automatically moves upwardly to its open position. Cam 109 carried by platen 46 at its extreme upward position closes microswitch 126 which starts timer 125 on its timing cycle. At the end of this cycle, during which the bellows is held in a tightly creased position, the timer 125 causes solenoid 106 to be energized, moving the valve 131 to closed position. The air in the system may then escape through ports 131. The cylinder 40 raises due to the springs tending to rotate the yoke 29 and bar 30 in a clockwise direction. This causes all the folding blades 94 and 149 to move outwardly and out of contact with the bellows and the pistons return to their lowermost position by gravity. In this position, the folded bellows is moved to its loading position beneath the folding mechanism. The operator may then, through the open door, move the handle 80 rearwardly to release the clamp bars 76. The compressed bellows now appearing like Fig. 13 may be lifted out. If desired, it may be put in a clamp to hold it in a creased and folded position for a period of time which may tend to set the creased and folded bellows, and which may tend to cause the bellows to normally close. This is a matter of choice.

It is obvious from the foregoing that an operator is protected against injury because the entire cycle may be initiated only by the movement of the arm 129, and this cannot occur until the door has been drawn down to close the cabinet and to completely exclude the operator's hands from the mechanism. When the door is fully closed, spring 161, Fig. 17, is allowed to rock shaft 121 and move roller 119 over the top of the door to overlie its upper edge. The entire cycle of the machine may again be summarized as follows:

1. Operator places bellows on block 70 and moves lever 80 to close clamps 76. This action closes microswitch 127, through cam 128 and lever 129, completing circuit through solenoid 114, opening valve 113.
2. Operator pulls door down to closed position, which permits roller 119 to move in over upper edge, preventing door from being lifted. Movement of roller closes microswitch 118 and energizes solenoid 105.
3. Valve 102 opens admitting air to system.
4. Platen is lifted by piston 57 to intermediate position.
5. Cam 109 on platen opens valve 111, admitting air to cylinder 40, which moves, down, thereby (a) rotates gears 135 through racks 133, (b) moves pitmans 138 to move blades 149, (c) moves lever 34 to open valve 116.
6. Air at reduced pressure fills bellows.
7. Operator depresses foot valve 108.
8. Air fills cylinder 51, raising platen to limit. Cam slots 96 cause blades 94 to fold two wide sides of bellows. Valve 116 is closed when pin 152 lifts lever 34.
9. Cam 109 closes microswitch 126, starting timer 125.
10. Timer holds circuits closed for selected time.
11. Pin 132 opens microswitch 118 and releases door latch.
12. Timer deenergizes solenoid 105 and energizes 106.
13. All air exhausts through ports 131.
14. Pistons and platen return by gravity.
15. Door opens during operation 13, 14.
16. Operator removes compressed and folded bellows.

From the foregoing it may be seen that a machine has been developed that is safe to operate and, with the exception of the human operations of closing the door and depressing one air valve, is fully automatic. The machine may be operated by relatively unskilled help.

Obviously, various sizes of bellows may be accommodated by suitably proportioning the clamps 76, blades 94 and 149, and the travel of the pistons. The entire organization of the elements which make up the total structure is also capable of some variation and modification, and the invention therefore should not be considered as limited to the single embodiment of the invention shown in the drawings and described herein, but only by the claims forming a part hereof.

I claim:

1. In a bellows folding machine, the combination with a pair of spaced bellows holding clamps for substantially air-tight engagement therewith, of a plurality of movably mounted fold plates for engaging the outside walls of a bellows to be folded, means for admitting compressed air into the bellows to be folded to press areas thereof against and between the fold plates, said fold plates comprising sets, one for each side of the bellows, each set including a lever mounted to move about a pivot at one end thereof and operatively engaging the plates of one set and means for moving the lever about its pivot to simultaneously move said plates relative to each other to vary the spacing thereof to a predetermined extent.

2. In a bellows folding machine, the combination with a pair of spaced bellows holding clamps for substantially air-tight engagement therewith, of a plurality of movably mounted fold plates for engaging the outside walls of a bellows to be folded, means for admitting compressed air into the bellows to be folded to press areas thereof against and between the fold plates, said fold plates comprising sets, one for each side of the bellows, each plate having a notch and including a lever pivotally mounted at one end for each set engaging the notches of the plates of a set, and mechanism for moving the levers about their pivots at one end to progressively move each of the plates of the sets.

3. The bellows folding machine defined in claim 2 characterized by each lever being fulcrumed to an end plate, whereby movement of the lever may move each plate of a set in the same direction and at increasing amounts as the plates lie progressively further from the fulcrum.

4. The bellows folding machine defined in claim 2 characterized by the shape of the notched walls of the plate being V-shaped so that the center part of the walls are closer together than the outer ends of the walls whereby the lever may move each plate through engagement with at least the center part of the spaced notched walls.

5. In a bellows folding machine, the combination with a pair of spaced bellows holding clamps for substantially air-tight engagement therewith, a plurality of movably mounted fold plates for engaging the outside walls of a bellows to be folded, means for admitting compressed air into the bellows to be folded to press areas against and between the fold plates, said fold plates comprising sets, one for each side of the bellows, each set including a lever movable about a fulcrum at one end and operatively engaging the plates of one set to simultaneously and positively move said plates to different extents relative to each other to vary the spacing thereof, one bellows holding clamp having movable jaws for attaching one end of the bellows, said movable jaws being pivotally attached to a movable plate, a handle for moving the movable plate, and mechanism for moving said clamp from a loading position beneath the fold plates to a folding position between the fold plates.

6. The bellows folding machine defined in claim 5 characterized by the other bellows clamp being normally immovable and positioned above and between the fold plates to be contacted by the bellows when the mechanism moves the movable clamp and a bellows to be folded from a loading to a folding position.

7. For use in a bellows folding machine of the type including a pair of spaced bellows holding clamps for substantially air-tight engagement therewith and including means for admitting compressed air into the bellows, a folding assembly comprising pairs of opposed sets of fold plates, each set including a plurality of fold plates arranged in parallel relationship, a plurality of carrying plates slidably mounted relatively to each other, each fold plate projecting from a separate carrying plate, means for moving each fold plate through a predetermined path to coact with the air-filled bellows blank held by the holding clamps, said means comprising a lever movably engaging each carrying plate, means for moving the lever, the fulcrum of the lever being selected to impart differential movement between the carrying plates when said lever is moved about its fulcrum.

8. For use in a bellows folding machine of the type including a pair of spaced bellows holding clamps for substantially air-tight engagement therewith and including means for admitting compressed air into the bellows, a folding assembly comprising pairs of opposed sets of fold plates, each set including a plurality of fold plates arranged in parallel relationship, a plurality of carrying plates slidably mounted relatively to each other, each fold plate projecting from a separate carrying plate, means for moving each fold plate through a predetermined path to coact with the air-filled bellows blank held by the holding clamps, said means comprising a lever movably engaging each carrying plate, means for moving the lever, the fulcrum of the lever being selected to impart differential movement between the carrying plates when said lever is moved about its fulcrum, each of said carrying plates being notched to receive the lever and to form said movable engagement therewith.

9. For use in a bellows folding machine of the type including a pair of spaced bellows holding clamps for substantially air-tight engagement therewith and including means for admitting compressed air to the bellows, a folding assembly comprising pairs of opposed sets of fold plates, each set including a plurality of fold plates arranged in parallel relationship, a plurality of carrying plates slidably mounted relatively to each other, each fold plate projecting from a separate carrying plate, means for positively moving each fold plate through a predetermined path to coact with the air-filled bellows blank held by the holding clamps, said means comprising a lever movably engaging each carrying plate, means for moving the lever, the fulcrum of the lever being selected to impart differential movement between the carrying plates when said lever is moved about its fulcrum, each of said carrying plates being notched to receive the lever and to form said movable engagement therewith, said notches having upper and lower V-shaped walls with the points of the V-shaped walls projecting toward each other and forming bearings for the lever.

10. In a bellows folding machine, the combination with spaced clamps for holding the ends of a tubular bellows blank to be folded, one clamp being movably mounted with respect to the other which is fixedly mounted, said movably mounted clamp having a rest or loading position spaced from the fixedly mounted clamp means for locking an end of the bellows to the movable clamp, a folding mechanism comprising a plurality of sets of movable fold plates coaxially arranged with respect to the two bellows clamps and normally spaced about the fixedly mounted one of these clamps and spaced above the other of these clamps a distance to permit the insertion and removal of a bellows blank when the movable clamp is in a loading position spaced from the fixedly mounted clamp, mechanism connected to the movable clamp for moving the latter toward the opposite clamp contacting the opposite end of the bellows with the opposed fixedly mounted clamp and moving the bellows from a loading into a folding position between the sets of fold plates, said mechanism including means operatively connected to the fold plates and the movably mounted clamp for moving the fold plates and clamp to compress and crease the bellows, and means for admitting compressed air to the bellows blank after the movable bellows clamp contacts the bellows with the opposed bellows clamp.

11. The bellows folding machine defined in claim 10 characterized by a casing extending about said mechanism, a door to the casing through which a bellows blank is loaded and unloaded, and means under the control of the door for preventing the operation of said mechanism until the door is in a predetermined position.

12. The bellows folding machine defined in claim 10 characterized by a casing extending about said mechanism, a door to the casing through which a bellows blank is loaded and unloaded, a release for said mechanism, and means operable by the position of said door for rendering the release inoperable unless the door is in a predetermined position.

13. The bellows folding machine defined in claim 10 characterized by a clamp moving mechanism comprising a cylinder, a piston in the cylinder connected to a piston rod, a second piston carried in a second cylinder in axial alignment with the first cylinder, the movable bellows clamp being carried by the second cylinder, an air line, a valve for admitting air to the first cylinder for raising a platen carrying the movable clamp with the bellows blank from a loading to a folding position between the sets of fold plates and in contact with the spaced clamp, a valve for admitting air to the second cylinder to move the movable clamp toward the opposed clamp to compress the bellows, and to move the folding mechanism through movement of the platen, connections between the platen and fold plates of the folding mechanism, and means for admitting air to the bellows before operating the bellows compressing and folding mechanisms.

14. The bellows folding machine defined in claim 10 characterized by a clamp moving mechanism comprising a cylinder, a piston in the cylinder connected to a piston rod, a second piston carried in a second cylinder in axial alignment with the first cylinder, the movable bellows clamp being carried by the second cylinder, an air line, a valve for admitting air to the first cylinder for raising a platen carrying the movable clamp with the bellows blank from a loading to a folding position between the sets of fold plates and in contact with the spaced clamp, a valve for admitting air to the second cylinder to move the movable clamp toward the opposed clamp to compress the bellows, and to move the folding mechanism through movement of the platen, connections between the platen and fold plates of the folding mechanism, and means for admitting air to the bellows before operating the bellows compressing and folding mechanisms, an enclosure around the bellows folding machine, a door for loading and unloading a bellows into the machine and a valve in the air line permitting operation of the bellows holding machine only when the door is closed.

15. In a bellows folding machine, the combination with a pair of spaced bellows clamps for substantially air-tight engagement therewith, of a plurality of movably mounted fold plates for engaging the outside walls of a bellows to be folded, means for admitting compressed air into the bellows to be folded to press areas thereof against and between fold plates, said fold plates comprising sets, one for each side of the bellows, each set engaging a lever movable about a fulcrum and operatively engaging each plate at different distances from said fulcrum to simultaneously and positively move each of said plates to different extents to vary the spacing therebetween, one bellows holding clamp having movable jaws for attaching one end of the bellows, a handle for moving the movable jaw, a platen carrying the last-mentioned bellows clamp, and means for moving the platen and its bellows clamp relative to the other bellows clamp.

16. The bellows folding machine defined in claim 15, characterized by each fold plate being carried by an apertured slidable plate, and the lever fulcrumed at one end passing through all the apertures of the slidable plates carrying one set of plates.

17. The bellows folding machine defined in claim 15, characterized in that a box-like guideway carries a plurality of slide plates and each slide plate carries a fold plate.

18. The bellows folding machine defined in claim 15, characterized in that a box-like guideway carries a plurality of side plates and each side plate carries a fold plate, the slide plates lying adjacent each other and being slidable one on the other when the lever fulcrumed at one end moves.

19. The bellows folding machine defined in claim 15, characterized in that a box-like guideway carries a plurality of slide plates and each side plate carries a fold plate, the slide plates lying adjacent each other and being slidable one on the other when the lever fulcrumed at one end moves under the impulse of the moving platen, said box-like guideway being movable with the platen, each lever operatively engaging a side of the box-like guideway.

WAYNE K. WIGHT.

REFERENCES CITED

The following references are of record in the file of this patent:

UNITED STATES PATENTS

| Number | Name | Date |
| --- | --- | --- |
| 1,277,982 | Matte | Sept. 3, 1918 |
| 1,411,779 | Glaze | Apr. 4, 1922 |
| 1,534,340 | Bernotow | Apr. 21, 1925 |
| 1,684,466 | Beardsley | Sept. 18, 1928 |
| 1,768,249 | Griffith | June 24, 1930 |
| 1,970,029 | Brunner et al. | Aug. 14, 1934 |
| 2,009,071 | Saar | July 23, 1935 |
| 2,086,375 | Baier et al. | July 6, 1937 |
| 2,123,175 | Balsam | July 12, 1938 |
| 2,169,205 | Hornung | Aug. 8, 1939 |
| 2,470,487 | Hollis | May 17, 1949 |
| 2,516,163 | Vaughan | July 25, 1950 |